United States Patent
Suchsland et al.

(10) Patent No.: US 12,294,092 B2
(45) Date of Patent: May 6, 2025

(54) MEMBRANE ELECTRODE ASSEMBLY INCLUDING ANODE HAVING HYDROGEN REDUCION CATALYST AND CARBON MONOXIDE OXIDATION CATALYST AND FUEL CELL

(71) Applicant: Greenerity GmbH, Alzenau (DE)

(72) Inventors: Jens-Peter Suchsland, Alzenau (DE); Thomas Martin, Haguenau (FR); Matthias Binder, Gelnhausen (DE); Dominik Gehrig, Hanau (DE); Christian Eickes, Frankfurt am Main (DE)

(73) Assignee: Greenerity GmbH, Alzenau (DE)

( * ) Notice: Subject to any disclaimer, the term of this patent is extended or adjusted under 35 U.S.C. 154(b) by 548 days.

(21) Appl. No.: 17/630,182

(22) PCT Filed: Jul. 10, 2020

(86) PCT No.: PCT/EP2020/069634
§ 371 (c)(1),
(2) Date: Jan. 26, 2022

(87) PCT Pub. No.: WO2021/018554
PCT Pub. Date: Feb. 4, 2021

(65) Prior Publication Data
US 2022/0255088 A1    Aug. 11, 2022

(51) Int. Cl.
*H01M 4/92* (2006.01)
*H01M 4/86* (2006.01)
*H01M 8/1004* (2016.01)

(52) U.S. Cl.
CPC ......... *H01M 4/921* (2013.01); *H01M 4/8652* (2013.01); *H01M 4/926* (2013.01); *H01M 8/1004* (2013.01)

(58) Field of Classification Search
CPC .... H01M 4/921; H01M 4/8652; H01M 4/926; H01M 8/1004
(Continued)

(56) References Cited

U.S. PATENT DOCUMENTS 6,855,452 B1 *  2/2005  Cooper ............... H01M 8/1004
                                                        429/492
2002/0004453 A1   1/2002  Haugen et al.
(Continued)

FOREIGN PATENT DOCUMENTS

DE          600 06 818 T2    8/2004
DE    11 2004 000 511 T5    2/2006
(Continued)

*Primary Examiner* — Sean P Cullen
(74) *Attorney, Agent, or Firm* — DLA Piper LLP (US)

(57) ABSTRACT

A membrane electrode assembly includes a cathode, an anode and a proton-conductive membrane, wherein the cathode includes a first metal-containing catalyst and a proton-conductive ionomer, the anode includes a proton-conductive ionomer, a second metal-containing catalyst that catalyzes the reaction of hydrogen to protons, and a third metal-containing catalyst that catalyzes the reaction of CO to $CO_2$, a total mass ratio of platinum of the second catalyst and platinum of the third catalyst to a total mass ratio of metals of the second catalyst and the third catalyst, with the exception of platinum, is greater than 3:1, and the total mass per unit area of platinum of the second catalyst and platinum of the third catalyst is less than 0.4 mg/cm².

11 Claims, 2 Drawing Sheets

(58) Field of Classification Search
USPC ................ 429/524, 526, 527, 528, 529, 532
See application file for complete search history.

(56) References Cited

U.S. PATENT DOCUMENTS

| | | |
|---|---|---|
| 2004/0197627 A1 | 10/2004 | Yan et al. |
| 2006/0099489 A1 | 5/2006 | Kwak et al. |
| 2008/0187817 A1 | 8/2008 | Cooper et al. |
| 2009/0029216 A1 | 1/2009 | Yamamoto |
| 2009/0246600 A1* | 10/2009 | Kadoma ............... H01M 4/926 |
| | | 429/532 |
| 2010/0330452 A1* | 12/2010 | Paik .................... H01M 4/8668 |
| | | 429/483 |
| 2014/0295316 A1 | 10/2014 | Ball et al. |
| 2020/0313201 A1* | 10/2020 | Martinez Bonastre ...................... |
| | | H01M 4/8652 |
| 2020/0321622 A1* | 10/2020 | Sharman ............. H01M 4/8828 |

FOREIGN PATENT DOCUMENTS

| | | | |
|---|---|---|---|
| EP | 0 736 921 A1 | 10/1996 | |
| JP | H10-270055 A | 10/1998 | |
| JP | 2011040177 A * | 2/2011 | |
| JP | 2011040178 A * | 2/2011 | |
| WO | WO-2017203257 A9 * | 2/2018 | .......... H01M 4/8652 |
| WO | WO-2019102197 A1 * | 5/2019 | .......... H01M 4/8652 |

* cited by examiner

Fig. 3

SUSD stability (loss/mV)

| Mass per unit area of Pt in anode in mg(Pt)/cm² | Mass ratio Pt : Ru | | |
|---|---|---|---|
| | 9 to 1 | 6 to 1 | 3 to 1 |
| 0.03 | 19 | 19 | 48 |
| 0.1 | 31 | 45 | 53 |
| 0.2 | 42 | 53 | 67 |

Fig. 4

CO tolerance (loss/mV)

| Mass per unit area of Pt in anode in mg(Pt)/cm² | Mass ratio Pt : Ru | | |
|---|---|---|---|
| | 9 to 1 | 6 to 1 | 3 to 1 |
| 0.03 | 86 | 54 | 25 |
| 0.1 | 20 | 17 | 12 |
| 0.2 | 7 | 9 | 8 |

MEMBRANE ELECTRODE ASSEMBLY INCLUDING ANODE HAVING HYDROGEN REDUCION CATALYST AND CARBON MONOXIDE OXIDATION CATALYST AND FUEL CELL

TECHNICAL FIELD

This disclosure relates to a membrane electrode assembly with high catalytic activity with improved tolerance to carbon monoxide (CO) and a fuel cell comprising the membrane electrode assembly.

BACKGROUND

Membrane electrode assemblies for fuel cell applications that comprise a proton-conductive membrane, which is coated on one side with an anode and on the other side with a cathode, are known. The anode contains platinum as a catalyst most of the times, which catalyzes the conversion of hydrogen supplied to the fuel cell into protons. For the reduction of oxygen on the cathode side, platinum is also used as a catalyst most of the times. A disadvantage of previous membrane electrode assemblies is their low tolerance to CO, which acts as a catalyst poison and secondarily reduces the performance of the membrane electrode assembly and thus also of a fuel cell.

It could therefore be helpful to provide a membrane electrode assembly, which is characterized by a high catalytic activity and also by a high CO tolerance and a fuel cell with a permanently high power density.

SUMMARY

We provide a membrane electrode assembly including a cathode, an anode and a proton-conductive membrane, wherein the cathode includes a first metal-containing catalyst and a proton-conductive ionomer, the anode includes a proton-conductive ionomer, a second metal-containing catalyst that catalyzes the reaction of hydrogen to protons, and a third metal-containing catalyst that catalyzes the reaction of CO to $CO_2$, a total mass ratio of platinum of the second catalyst and platinum of the third catalyst to a total mass ratio of metals of the second catalyst and the third catalyst, with the exception of platinum, is greater than 3:1, and the total mass per unit area of platinum of the second catalyst and platinum of the third catalyst is less than 0.4 $mg/cm^2$.

We also provide a fuel cell including the membrane electrode assembly including a cathode, an anode and a proton-conductive membrane, wherein the cathode includes a first metal-containing catalyst and a proton-conductive ionomer, the anode includes a proton-conductive ionomer, a second metal-containing catalyst that catalyzes the reaction of hydrogen to protons, and a third metal-containing catalyst that catalyzes the reaction of CO to $CO_2$, a total mass ratio of platinum of the second catalyst and platinum of the third catalyst to a total mass ratio of metals of the second catalyst and the third catalyst, with the exception of platinum, is greater than 3:1, and the total mass per unit area of platinum of the second catalyst and platinum of the third catalyst is less than 0.4 $mg/cm^2$.

BRIEF DESCRIPTION OF THE DRAWINGS

FIG. 3 is a table illustrating the test results from FIG. 2 for performance stability.

FIG. 4 is a table illustrating the test results from FIG. 2 for CO stability.

LIST OF REFERENCE SYMBOLS

Figure 1:
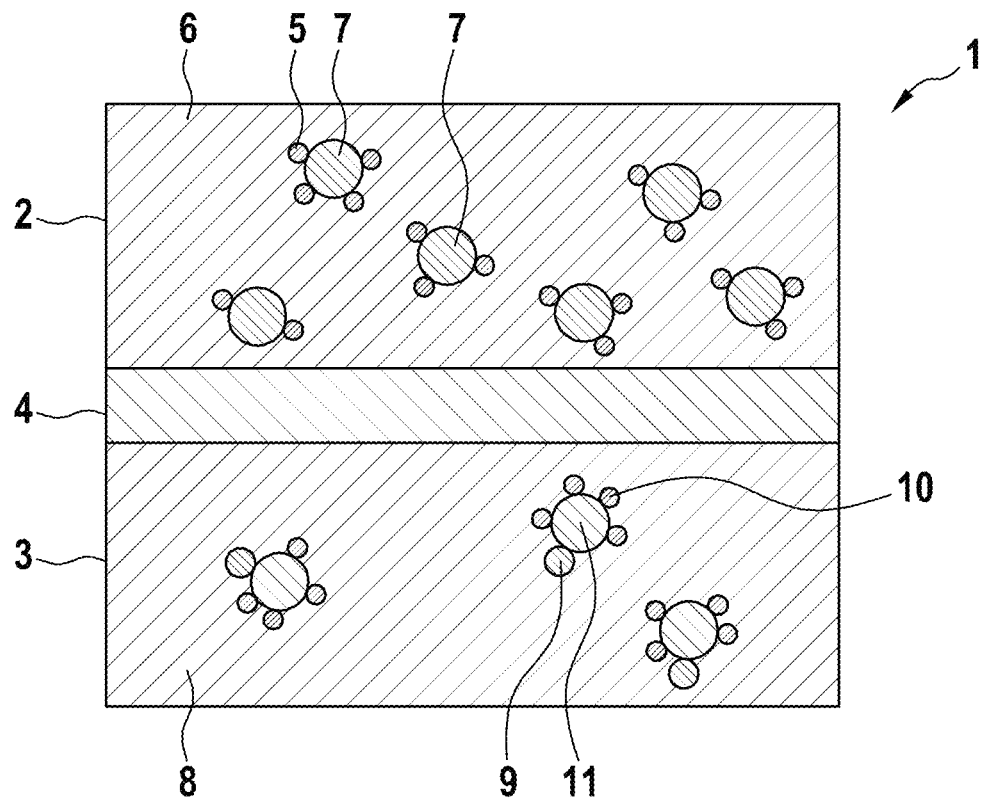
FIG. 1 shows a membrane electrode assembly according to an example in section.

1 Membrane electrode assembly
2 cathode
3 anode
4 proton-conductive membrane
5 first catalyst
6 proton-conductive ionomer
7 electrically conductive support
8 proton-conductive ionomer
9 second catalyst
10 third catalyst
11 electrically conductive support

DETAILED DESCRIPTION

Our membrane electrode assembly comprises a cathode, an anode, and a proton-conductive membrane. The membrane is arranged between the cathode and the anode. The cathode comprises a first metal-containing catalyst and a proton-conductive ionomer. The first catalyst is preferably distributed homogeneously in the ionomer so that there is a high catalytic activity over the entire cathode and oxygen is effectively converted. The first catalyst is in detail limited only to the fact that it catalyzes the cathode reaction, i.e., the reduction of oxygen.

The anode also comprises a proton-conductive ionomer and in addition a second metal-containing catalyst, which catalyzes the oxidation of hydrogen to protons. In other words, the second catalyst catalyzes the anode reaction, i.e., the conversion (oxidation) of hydrogen to protons. The protons then migrate through the proton-conductive membrane and then react with the reduced oxygen.

The anode also comprises a third metal-containing catalyst that catalyzes the reaction of CO to $CO_2$, i.e., the oxidation of CO. CO, which acts as a catalyst poison and reduces the performance of the electrodes, can, for example, be introduced by the hydrogen-containing fuel gas. If not removed quickly, it blocks the active sites of the catalysts and significantly reduces the power density of the membrane electrode assembly. By providing the third catalyst, existing CO is oxidized to $CO_2$ and thus rendered harmless. $CO_2$ does not inhibit the performance of the catalytic converters so that the third catalytic converter increases the tolerance to CO. The total mass ratio of platinum of the second catalyst and of platinum of the third catalyst to the total mass ratio of metals of the second catalyst and the third catalyst, with the exception of platinum, is greater than 3:1. Only through this mass ratio, a high long-term stability of the power density and at the same time a high CO tolerance in the membrane electrode assembly is achieved.

The metal-containing first, second and third catalysts are any metal-containing catalysts that catalyze the corresponding desired reaction and contain at least one metal. The metal can be in different forms. Exemplary catalysts include (pure, i.e., elemental) metals such as noble metals, including Ir, Ru and Pt, but also metal oxides and alloys of two or more metals. The second catalyst and the third catalyst can contain the same metal, but are then present in a different form. For example, the second catalyst is then a (pure) metal and the third catalyst is an alloy. Or the second catalyst is a (pure) metal and the third catalyst is a metal oxide. Or the second catalyst is a metal oxide and the third catalyst is an alloy. Any combinations of metal-containing catalysts in the second and third catalysts are possible.

The mass ratio is determined based on the respective mass of the metal (or metals) of the corresponding metal-containing catalyst. The second catalyst or the third catalyst or the second catalyst and the third catalyst can contain platinum. It is not necessary that both the second catalyst and the third catalyst contain platinum as long as the mass ratio of the total mass of platinum in the second and third catalyst to the total mass of the other metals in the second catalyst and in the third catalyst, i.e., all metals with the exception of platinum, is greater than 3:1.

The total mass per unit area of platinum of the second catalyst and of platinum of the third catalyst is less than 0.4 mg/cm$^2$ as a result of which very good catalytic properties can be obtained with minimal financial outlay at the same time.

The CO tolerance can advantageously be improved, simultaneously with the membrane electrode assembly having a very good power density, by the total mass ratio of platinum of the second catalyst and of platinum of the third catalyst to the total mass ratio of metals of the second catalyst and the third catalyst, with the exception of platinum, being less than or equal to 9:1.

Advantageously, the second catalyst and the third catalyst are each arranged on an electrically conductive support. The electrically conductive support on which the second catalyst and the third catalyst are arranged can each be the same electrically conductive support or different electrically conductive supports can be used. This allows the electrical conductivity of the anode to be improved, which is beneficial to the power density of the membrane electrode assembly. The second catalyst and/or the third catalyst can be present in discrete electrode layers or can be distributed homogeneously in a common electrode layer. In the first example, the following layer sequence results for the membrane electrode assembly: cathode/membrane/anode layer 1/anode layer 2. In the second example, the following sequence of layers results for the membrane electrode assembly: cathode/membrane/anode.

Due to the very high reactivity and thus the good catalyzing properties, the second catalyst and the third catalyst are selected from: an alloy, a metal, a metal oxide, or a mixture of these compounds. At least one of these metal-containing compounds of the second and/or third catalyst contains platinum to adjust the ratio of the total mass of platinum of the second catalyst and of platinum of the third catalyst to the total mass ratio of metals of the second catalyst and the third catalyst, with the exception of platinum, to greater than 3:1. The second catalyst is preferably platinum. The third catalyst is also advantageously a platinum alloy since platinum alloys can be selected very well in the light of a CO binding and conversion activity.

The alloy particularly advantageously comprises platinum and at least one element selected from the group consisting of Ru, Rh, Ni, Cu, and Ir. Among the alloying elements mentioned above, Ru is particularly preferred since it binds CO very quickly and thus effectively and also accelerates the conversion to $CO_2$.

The electrically conductive support or the electrically conductive supports are also advantageously selected from conductive carbon, inorganic oxides, and mixtures thereof. Due to the simplified processing, it is particularly advantageous to use either electrically conductive carbon or one or more oxides.

It is further advantageous if the electrically conductive support or the electrically conductive supports have a specific surface area of 50 to 1000 m$^2$/g since the second catalyst and the third catalyst can thus be distributed particularly finely and evenly in the anode. This improves the activity of the anode due to the increase in binding sites on the catalyst for carrying out the catalytic reaction. The specific surface area is determined by nitrogen adsorption (BET method) in accordance with DIN ISO 9277:2003-05 "Determination of the specific surface area of solids by gas adsorption according to the BET method."

Advantageously, the mass per unit area of platinum of the second catalyst may be less than 0.3 mg/cm$^2$. The mass per unit area of platinum means the mass of platinum of the second catalyst in relation to the geometric area of the anode directed towards the membrane. With a platinum mass per unit area of the second catalyst of less than 0.3 mg/cm$^2$, the costs can be kept as low as possible with a very high catalytic activity of the anode.

To achieve particularly good catalytic properties, the total mass per unit area of platinum of the second catalyst and of platinum of the third catalyst is advantageously more than 0.015 mg/cm$^2$ and in particular more than 0.03 mg/cm$^2$.

For the above reasons, it is further preferred that the mass per unit area of platinum of the second catalyst is more than 0.015 mg/cm$^2$ and in particular more than 0.03 mg/cm$^2$.

To obtain a particularly high long-term stability of the performance of the membrane electrode assembly, i.e., a high catalytic activity in the conversion of the fuels used, with a very good CO tolerance, the mass ratio of platinum of the first catalyst to the total mass ratio of metals of the second catalyst and the third catalyst, with the exception of platinum, is greater than 12:1 and in particular greater than 35:1. This ratio allows a long-lasting high power density even if an alloy metal such as ruthenium, migrates from the anode to the cathode during operation. This process can lead to a reduction in the catalytic activity of the cathode and is less pronounced if the aforementioned catalyst ratios are adhered to.

Due to the very good catalytic activity in the conversion of oxygen with protons to water, the first catalyst is advantageously selected from platinum, platinum alloys, transition metals, transition metal alloys, and mixtures thereof.

To achieve the most uniform possible distribution with a low catalyst concentration and thus a very high catalytic activity of the cathode, the first catalyst may be arranged on an electrically conductive support. An electrically conductive support as has been described above as being advantageous for the support of the second catalyst and the third catalyst, can be used as the electrically conductive support.

If a transition metal alloy is used as the first catalyst, the transition metal alloy is in particular selected from platinum and cobalt. Platinum-cobalt alloys have proven to be readily available and have a high catalytic activity.

Likewise, a fuel cell is also described that comprises the membrane electrode assembly disclosed above. Due to the use of the membrane electrode assembly, a fuel cell with a permanently high power density that is tolerant of CO is achieved.

The advantages, advantageous effects, and developments described for the membrane electrode assembly are also applied to the fuel cell.

Further details, advantages, and features emerge from the following description of examples with reference to the drawings:

In FIG. 1, only the essential features of the membrane electrode assembly are shown. All other features are omitted for the sake of clarity.

FIG. 1 shows a membrane electrode assembly 1 that comprises a cathode 2 and an anode 3, which have a proton-conductive membrane 4 between them. The anode 3 is the electrode at which hydrogen is oxidized to protons, which then further react to form water. The cathode 2 is the electrode at which oxygen is reduced.

The cathode 2 comprises a first catalyst 5 and a proton-conductive ionomer 6, wherein the first catalyst 5 catalyzes the reduction of oxygen and comprises in particular platinum, a platinum alloy, one or more transition metals, or mixtures thereof. The first catalyst is preferably arranged on an electrically conductive support 7.

The anode 3 also comprises a proton-conductive ionomer 8, a second catalyst 9, which catalyzes the reaction of hydrogen to form protons, and a third catalyst 10, which catalyzes the reaction of CO to $CO_2$. Both the second catalyst 9 and the third catalyst 10 are supported on an electrically conductive support 11.

The second catalyst 9 is platinum and the third catalyst 10 is a platinum alloy. In the platinum alloy, platinum forms the main component in % by mass and at least one of the elements selected from the group consisting of Ru, Rh, Ni, Cu, and Ir serves as a doping element.

The total mass ratio of platinum of the second catalyst 9 and of platinum of the third catalyst 10 to the total mass ratio of metals of the second catalyst 9 and the third catalyst 10, with the exception of platinum, is more than 3:1 and less than 10:1.

The membrane electrode assembly 1 is characterized by a high long-term stability of the power density and a very high tolerance to CO.

The following tests were also carried out. Membrane electrode assemblies were produced with a cathode which, as the first metal-containing catalyst, contained platinum with a mass per unit area of 0.40 $mg_{Pt}/cm^2$ in the form of a platinum-cobalt alloy on a high surface area carbon and, in addition, a proton-conductive ionomer with an ion exchange capacity of about 1.27 meq/g, and an anode, which also comprised a proton-conductive ionomer with an ion exchange capacity of about 1.27 meq/g, a second metal-containing catalyst catalyzing the reaction of hydrogen to protons and a third metal-containing catalyst catalyzing the reaction of CO to $CO_2$. Platinum was used as the second catalyst and a platinum-ruthenium alloy as the third catalyst.

In each of the membrane electrode assemblies produced, the total mass ratio of platinum of the second catalyst and of platinum of the third catalyst (here 57.4% by mass) to the total mass ratio of metals of the second catalyst (here 0% by mass) and the third catalyst (here 42.6% by mass), with the exception of platinum (Ru), was varied.

The manufacture of the membrane electrode assembly was generally as follows.

First, separate dispersions ("inks") were produced for the production of anode catalyst layers and cathode catalyst layers by dispersing the respective catalysts, proton-conductive ionomer, and suitable solvents (selected from water and organic solvents) by a suitable dispersion unit. The second and third catalysts were used to produce the anode catalyst dispersion and their composition was varied such that different ratios of platinum to non-platinum metals were achieved. Anode inks and cathode inks were then coated onto PTFE support films and dried to produce anode layers and cathode layers with the desired mass per unit area (loading) with respect to the platinum metal. A proton-conductive membrane was then arranged between the anode layers and cathode layers on the support films and pressed under pressure and heat such that the previously produced electrode layers were transferred to the membrane. Perfluorinated or hydrocarbon-based, functionalized with acid groups (e.g., sulfonic acids or carboxylic acids) polymers can be used. The acid groups are usually arranged in a side chain, the chain length of which can be of different lengths and can be either linear or branched. The organic solvents used can usually be alcohols, ketones, aldehydes, carboxylic acids, carboxylic acid esters, ethers, or amides, each with a different chain length and cyclic structures, or else mixtures thereof.

Anode 1 (Pt:Ru=9:1):

7.00 g of a pure platinum catalyst, consisting of 19.9% by mass of platinum and 80.1% by mass of carbon support, and 0.77 g of a platinum-ruthenium alloy catalyst, consisting of 30.5% by mass of platinum, 23.6% by mass of ruthenium and 45.9% by mass of carbon support, were dispersed together with 19.20 g of an ionomer dispersion, consisting of 24.9% proton-conductive ionomer and 75.1% by mass of water, and 73.03 g of further solvents for 1 h in a suitable dispersion unit. The catalyst ink obtained was coated on a PTFE support film and the wet layer thickness was adjusted such that a mass per unit area in relation to platinum between 0.015 $mg/cm^2$ and 0.2 $mg/cm^2$ was obtained.

Anode 2 (Pt:Ru=6:1):

6.64 g of a pure platinum catalyst, consisting of 19.9% by mass of platinum and 80.1% by mass of carbon support, and 1.19 g of a platinum-ruthenium alloy catalyst, consisting of 30.5% by mass of platinum, 23.6% by mass of ruthenium and 45.9% by mass of carbon support, were dispersed together with 18.88 g of an ionomer dispersion, consisting of 24.9% proton-conductive ionomer and 75.1% by mass of water, and 73.29 g of further solvents for 1 h in a suitable dispersion unit. The catalyst ink obtained was coated on a PTFE support film and the wet layer thickness was adjusted so that a mass per unit area in relation to platinum between 0.015 $mg/cm^2$ and 0.2 $mg/cm^2$ was obtained.

Anode 3 (Pt:Ru=3:1):

4.76 g of a pure platinum catalyst, consisting of 19.9% by mass of platinum and 80.1% by mass of carbon support, and 2.34 g of a platinum-ruthenium alloy catalyst, consisting of 30.5% by mass of platinum, 23.6% by mass of ruthenium and 45.9% by mass of carbon support, were dispersed together with 15.62 g of an ionomer dispersion, consisting of 24.9% proton-conductive ionomer and 75.1% by mass of water, and 77.27 g of further solvents for 1 h in a suitable dispersion unit. The catalyst ink obtained was coated on a PTFE support film and the wet layer thickness was adjusted so that a mass per unit area in relation to platinum between 0.015 $mg/cm^2$ and 0.2 $mg/cm^2$ was obtained.

Cathode:

6.67 g of a platinum-cobalt alloy catalyst, consisting of 48.5% by mass of platinum, 4.9% by mass of cobalt and 46.6% by mass of carbon support, and 93.33 g of an ionomer dispersion, consisting of 3.60% by mass of proton-conductive ionomer and 96.4% by mass of water, and other solvents were dispersed in a stirred ball mill for 1 h. The catalyst ink obtained was coated on a PTFE support film and the wet layer thickness adjusted such that a mass per unit area in relation to platinum of 0.4 $mg/cm^2$ was obtained.

Manufacture of the Electrode-Membrane Composite:

Supported anode catalyst layers and cathode catalyst layers were arranged congruently on opposite sides of a proton-conductive membrane and then pressed in a press at a temperature of 160° C. for 5 min under pressure so that a composite was formed between the electrodes and the membrane and the electrodes could be removed from the corresponding PTFE support films without residue.

The measurement parameters were as follows.

Power Density and CO Tolerance:

First, the cell voltage of the catalyst-coated membranes without CO contamination was investigated using a polarization curve. The cell temperature was 80° C., the gas temperature was 64° C., the humidification was 50% RH, accordingly. The pre-pressure at the gas inlet was 1.5 bar.

The hydrogen gas stream was then enriched with 0.2 ppm CO on the anode side and made available to the anode with a nitrogen dilution of 30% by volume. The power density was examined again. The reduction in cell voltage at a current density of 1.2 A cm$^{-2}$ is an indicator of the CO tolerance of the catalyst-coated membrane.

Start-Up/Shut-Down Cycle Test (SUSD)

SUSD cycles were carried out in a gas switching test with a precisely defined dwell time at the hydrogen/air boundary. The anode side was equipped with a three-way valve that enabled switching from dry air to humidified hydrogen and vice versa. To simulate the start-up, the anode flow field was first filled with dry air. A switch was then made to humidified hydrogen, which led to the formation of a hydrogen-air boundary. Conversely, during the shutdown process, the hydrogen-filled anode flow field was flushed with air, which led to the formation of an air-hydrogen boundary. The operating conditions were kept constant in both chambers (anode and cathode) of the cell during the SUSD experiment (1.5 bar absolute, inlet, cell temperature 35° C., gas temperature 30° C., and 75% RH). The residence time of the hydrogen-air boundary in the cell was defined by the volume of the flow field and the volume flow of the gases supplied and was 0.3 s. The time between start-up and shut-down was set to 120 s. A total of 500 SUSD cycles were repeated.

Power Density and CO Tolerance According to SUSD Cycles:

A polarization curve was measured again after the SUSD cycles. The reduction in cell voltage was examined in relation to the first measurement. Subsequently, the CO tolerance was again examined analogously to the method described above.

Figure 2:
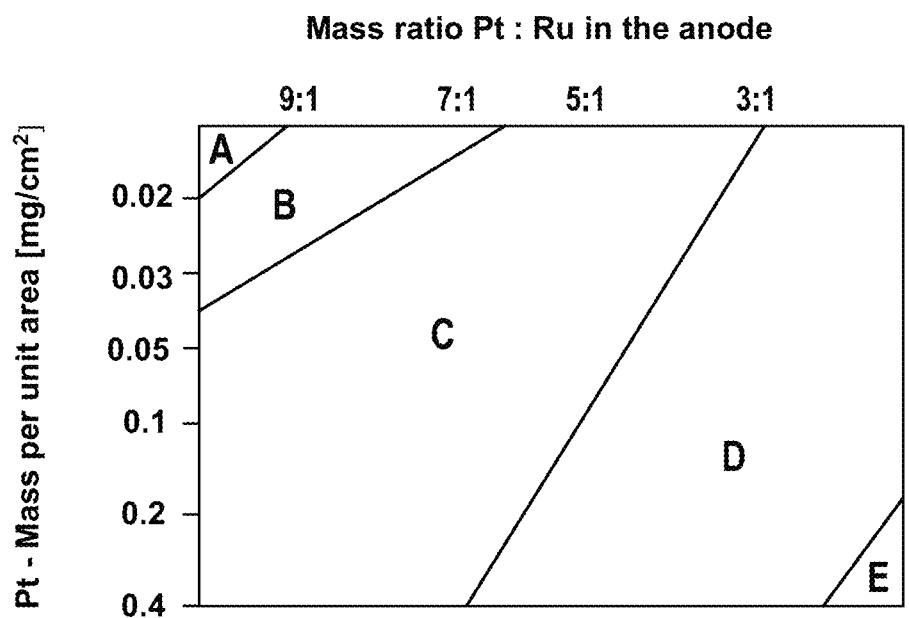
FIG. 2 is a graph illustrating test results for power stability and CO stability.

As can be seen from the graph in FIG. 2, the total mass ratio of platinum of the second catalyst and of platinum of the third catalyst to the total mass ratio of metals of the second catalyst and the third catalyst, with the exception of platinum (Ru), varied in a range of about 10:1 up to about 2:1. With regard to the performance stability and CO stability of the membrane electrode assemblies, 5 areas could be distinguished: In area A, i.e., with a mass ratio of Pt:Ru of more than 9:1 and a low loading of the anode in relation to the mass per unit area of the platinum, the CO tolerance was significantly reduced. In area E, i.e., with a mass ratio of Pt:Ru of less than 3:1 and a high loading of the anode in relation to the mass per unit area of the platinum, the long-term stability of the (catalytic) performance of the membrane electrode assemblies was significantly reduced. In areas B and D, good results were achieved both for the long-term stability of the (catalytic) performance and for the CO tolerance, with the best results being obtained in area C.

The table in FIG. 3 illustrates the test results from FIG. 2. The table shows the long-term stability of the (catalytic) performance of the membrane electrode assembly, or the loss of cell voltage after 500 SUSD cycles at a current density of 1.2 A cm$^{-2}$, wherein especially for high Ru contents, i.e., for a high anode loading of 0.2 mg cm$^{-2}$ in combination with a Pt:Ru mass ratio of 3:1, a significant reduction in the cell voltage of over 50 mV was observed.

The table in FIG. 4 likewise illustrates the test results from FIG. 2. The table shows that with the mass ratio Pt:Ru in a range from 9:1 to 3:1, good CO tolerances and performances of the membrane electrode assembly are obtained, wherein at the threshold to low Ru contents, i.e., with very low anode loading and a mass ratio Pt:Ru of 9:1, the values have already deteriorated significantly. By additionally varying the mass per unit area of Pt in the anode, the CO tolerance and the performance of the membrane electrode assembly could be further improved.

In addition to the above written description, reference is hereby made explicitly to the graphic representation in the figures for supplementary disclosure thereof.

The invention claimed is:

1. A fuel cell comprising a membrane electrode assembly comprising a cathode, an anode and a proton-conductive membrane, wherein
   the cathode comprises a first metal-containing catalyst and a proton-conductive ionomer,
   the anode comprises a proton-conductive ionomer, a second metal-containing catalyst that catalyzes a reaction of hydrogen to protons, and a third metal-containing catalyst that catalyzes a reaction of CO to $CO_2$,
   a total mass ratio of platinum of the second catalyst and platinum of the third catalyst to a total mass ratio of metals of the second catalyst and the third catalyst, but not including platinum, is greater than 3:1 and smaller than or equal to 9:1,
   wherein the mass ratio of platinum of the first catalyst to the total mass ratio of metals of the second catalyst and the third catalyst, but not including platinum, is greater than 12:1, and
   the total mass per unit area of platinum of the second catalyst and platinum of the third catalyst is less than 0.4 mg/cm$^2$, and
   wherein the third catalyst is an alloy, and the alloy comprises platinum and at least one element selected from the group consisting of Ru, Rh, Ni, Cu and Ir.

2. The fuel cell according to claim 1, wherein the membrane is selected from the group consisting of perfluorinated, partially fluorinated and non-fluorinated materials, and/or the layer thickness of the membrane is 3 to 20 μm.

3. The fuel cell according to claim 1, wherein the first catalyst is selected from the group consisting of platinum, platinum alloys, transition metals, transition metal alloys and mixtures thereof.

4. The fuel cell according to claim 1, wherein the first catalyst is selected from the group consisting of transition metals, transition metal alloys and mixtures thereof, and wherein the transition metal is cobalt or nickel.

5. The fuel cell according to claim 1, wherein the first catalyst is arranged on an electrically conductive support.

6. The fuel cell according to claim 1, wherein the second catalyst is platinum.

7. The fuel cell according to claim 1, wherein the mass per unit area of platinum of the second catalyst is more than 0.03 mg/cm$^2$.

8. The fuel cell according to claim 1, wherein the mass per unit area of platinum of the second catalyst is less than 0.3 mg/cm$^2$ and/or the total mass per unit area of platinum of the second catalyst and platinum of the third catalyst is more than 0.015 mg/cm², and/or the mass per unit area of platinum of the second catalyst is more than 0.015 mg/cm².

9. The fuel cell according to claim 1, wherein the total mass per unit area of platinum of the second catalyst and platinum of the third catalyst is more than 0.03 mg/cm².

10. The fuel cell according to claim 1, wherein the second catalyst and the third catalyst are each arranged on an electrically conductive support.

11. The fuel cell according to claim 10, wherein the electrically conductive support is selected from electrically conductive carbon, inorganic oxides and mixtures thereof and/or the electrically conductive support has a specific surface area of 50 to 1000 m²/g.

* * * * *